(No Model.)
R. HOLMES.
NUT LOCK.
No. 501,345.
Patented July 11, 1893.
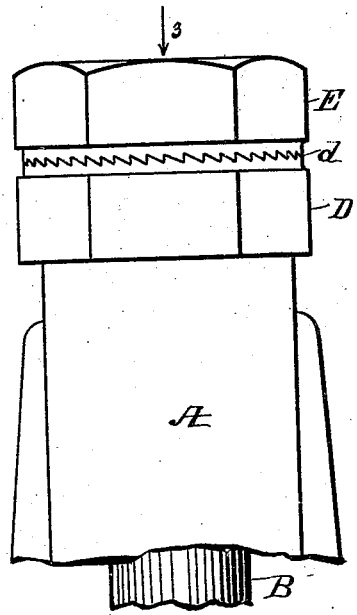
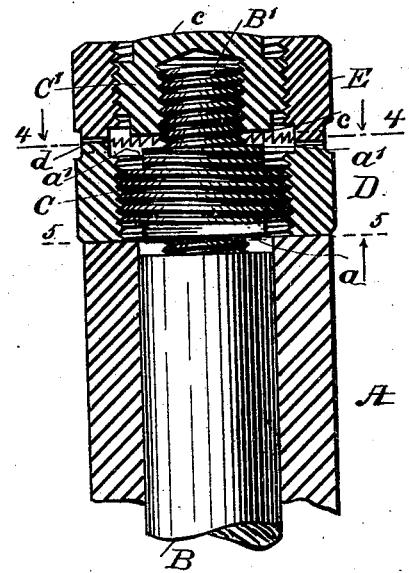
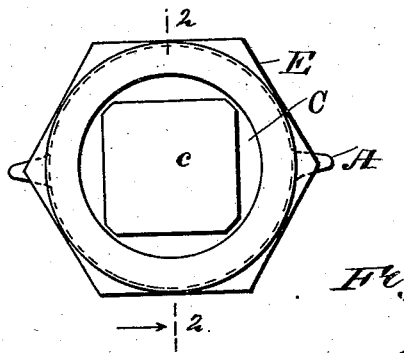
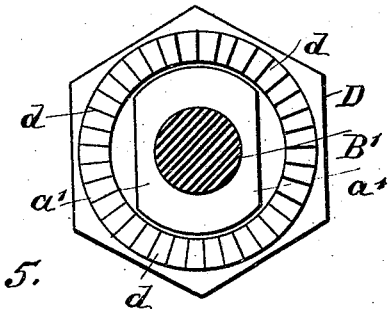
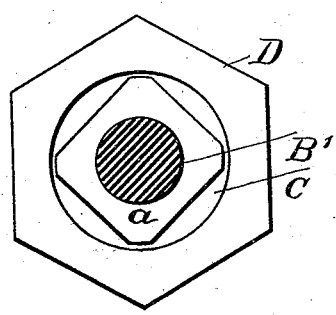
WITNESSES:
J. A. Bergstrom
C. Sedgwick
INVENTOR
R. Holmes
BY
Munn & Co
ATTORNEYS.

UNITED STATES PATENT OFFICE.

ROBERT HOLMES, OF CAÑON CITY, COLORADO.

NUT-LOCK.

SPECIFICATION forming part of Letters Patent No. 501,345, dated July 11, 1893.

Application filed November 30, 1892. Serial No. 453,616. (No model.)

*To all whom it may concern:*

Be it known that I, ROBERT HOLMES, of Cañon City, in the county of Fremont and State of Colorado, have invented a new and useful Improvement in Nut-Locks, of which the following is a full, clear, and exact description.

This invention relates to improvements in nut locks of the ratchet tooth type, and has for its object to produce a novel device of the character indicated, which will be reliable in service and which may be easily adjusted to lock or release the nut.

To this end my invention consists in the construction and combination of parts, as is hereinafter described and claimed.

Reference is to be had to the accompanying drawings forming a part of this specification, in which similar letters of reference indicate corresponding parts in all the figures.

Figure 1 is a side view of the improvement in locked adjustment on an axle box and axle spindle in part. Fig. 2 is a longitudinal sectional view on the line 2—2 in Fig. 3. Fig. 3 is an end view opposite the arrow 3 in Fig. 1. Fig. 4 is a transverse sectional view on the line 4—4 in Fig. 2; and Fig. 5 is a cross section on the line 5—5 in Fig. 2.

While the improvement is applicable to lock nuts on all kinds of machinery needing such appliances, it is herein shown, for the purpose of illustrating its use, as applied to lock the keeper nut on the outer end of a vehicle axle spindle, so that the axle box will be rotatably secured on the spindle.

In the drawings, A represents the outer end portion of an ordinary vehicle axle box, and B the end portion of an axle spindle that is designed to be loosely secured within the box by the improvement, which latter comprises two similar sleeve nuts C, C', that are internally threaded to engage with the right hand thread formed on the outer end B' of the axle spindle B.

The sleeve nut C which is intended to first engage the threaded part B' is furnished with a square projection *a* at one end, and at the other end has two parallel sides *a'* produced by cutting away the material oppositely, these formations being designed to facilitate the manipulation of the sleeves with a proper implement.

The exterior surface of the sleeve nut C is cylindrical, and has a thread of the same gage as that on the spindle end, but oppositely pitched, or in other words, cut left-handed.

The sleeve nut C' is axially perforated nearly through its body and internally threaded to fit neatly on the spindle end B', whereon it is placed after the sleeve nut C has been located on the inner part of said end portion, as shown in Fig. 2.

The sleeve nut C' is cylindrical externally and threaded similarly to the sleeve nut C, and has each end reduced on four sides to provide square end portions *c* for an engagement therewith of a socket wrench of ordinary form.

Upon the sleeve nuts C, C', the hexagon jam nuts D, E, are fitted, these having internal left-hand threads of a gage that will adapt them to each fit upon either of the sleeve nuts.

The face of the jam nut D that is to have a loose bearing upon the true end of the axle box A, as indicated at the line 5 in Fig. 2, is made level, as is also the outer face of the jam nut E. The other face of each of the jam nuts D, E, is serrated, the ratchet teeth *d* cut thereon, being of an equal number for each nut and of like dimensions so that when these serrated faces are made to impinge, the teeth will interlock, as indicated in Fig. 1.

When the composite nut lock is to be applied to a spindle B, the sleeve nut C is first screwed upon the threaded end B' until near the plain portion of the spindle, and the jam nut D is screwed upon the sleeve nut until it is adjacent to the true outer end of the axle box A. A socket wrench (not shown) of proper shape to fit upon the outer end portion of the sleeve nut C, is applied thereto, and at the same time a hexagon spanner wrench of ordinary form is placed on the jam nut D, so as to hold it from rotating; the revoluble movement of the socket wrench which is engaged with the sleeve nut C of a sufficient degree to unscrew the sleeve nut one or more turns, will correspondingly screw the jam nut D toward the axle box, so that by proper manipulation as described, the nut D may be given a correct adjustment with regard to said axle box. The sleeve nut C' is now screwed upon the spindle end portion B', and the jam nut E upon said sleeve nut, so that its serrated face *d* will be nearly in contact with the similar serrated face of the jam nut D, the teeth of each circular rack on the jam nuts being so placed as to adapt the teeth of one nut to enter the depressions on the other which lie directly opposite them. The socket wrench which should fit on two of the parallel sides of the squared end of the sleeve nut C', is now made to engage with said end, and the spanner wrench before used is slid upon the hexagon contour of the jam nut E, so as to hold said nut from turning. The socket wrench is now manipulated so as to turn the sleeve nut in a direction to screw it on the spindle end B', which will propel the jam nut E squarely against the jam nut D, and interlock the teeth of said nuts, as shown in Figs. 1 and 2, which will secure all parts of the composite nut lock on the spindle end and the jam nut D in loose contact with the true end of the axle box A.

When it is necessary to release the nut lock, it is readily effected by a reversal of the operation hereinbefore described.

Having thus fully described my invention, I claim as new and desire to secure by Letters Patent—

1. A nut lock, comprising two sleeve nuts adapted to engage the same bolt end that is cut with a right-hand thread, left-hand threads on each sleeve nut externally, and two jam nuts tapped within to fit on the sleeve nuts, and adapted to have a locked engagement with each other when impinged, substantially as described.

2. In a nut lock, the combination with two cylindrical sleeve nuts having equal diameter and externally threaded left-handed, right-hand threads in the sleeve nuts adapted to engage with the same bolt end, and a squared reduction on each end of the sleeve nuts adapted to fit the same socket wrench, of two similar jam nuts hexagonal externally, internally threaded to fit on the sleeve nut threads, and ratchet teeth in a continuous circle, each formed on an end face of each jam nut, substantially as described.

ROBERT HOLMES.

Witnesses:
GEORGE E. DUDLEY,
ROBERT DICKEY.